United States Patent [19]

Müller et al.

[11] 4,145,874

[45] Mar. 27, 1979

[54] SHACKLE FOR CHAINS, ESPECIALLY FOR SLING CHAINS

[75] Inventors: Anton Müller, Aalen-Unterkochen; Günter Witzel, Aalen, both of Fed. Rep. of Germany

[73] Assignee: Eisen- und Drahtwerk Erlau Aktiengesellschaft, Aalen, Fed. Rep. of Germany

[21] Appl. No.: 799,310

[22] Filed: May 23, 1977

[30] Foreign Application Priority Data

May 22, 1976 [DE] Fed. Rep. of Germany ....... 2623043

[51] Int. Cl.² .............................................. F16G 15/06
[52] U.S. Cl. ........................................... 59/86; 59/93
[58] Field of Search ................................ 59/86, 85, 93; 294/78 R, 82 R

[56] References Cited

U.S. PATENT DOCUMENTS

| 245,448 | 8/1881 | Church | 59/86 |
| 897,347 | 9/1908 | Buckius | 59/86 |
| 1,517,346 | 12/1924 | Crandall | 59/86 |
| 2,709,616 | 5/1955 | Larson | 59/86 |
| 2,877,621 | 3/1959 | Robbins | 59/93 |
| 3,959,909 | 6/1976 | Buschini | 59/86 |
| 3,974,641 | 8/1976 | Rieger | 59/93 |

FOREIGN PATENT DOCUMENTS

| 608512 | 1/1935 | Fed. Rep. of Germany | 59/86 |
| 2234536 | 3/1973 | Fed. Rep. of Germany | 59/86 |
| 1161490 | 3/1958 | France | 59/86 |

Primary Examiner—C.W. Lanham
Assistant Examiner—Gene P. Crosby
Attorney, Agent, or Firm—Walter Becker

[57] ABSTRACT

A shackle for chains, especially sling chains, which includes a shackle stirrup and a shackle bolt. In closed position of the shackle. The shackle bolt is located in aligned bores provided in the legs of the shackle stirrup and is held in the said stirrup by means of at least one securing member. At least one end section of the bolt extends between the legs of the shackle and has a cross section which is smaller than the cross section of the bores in the legs of the shackle stirrup.

6 Claims, 6 Drawing Figures

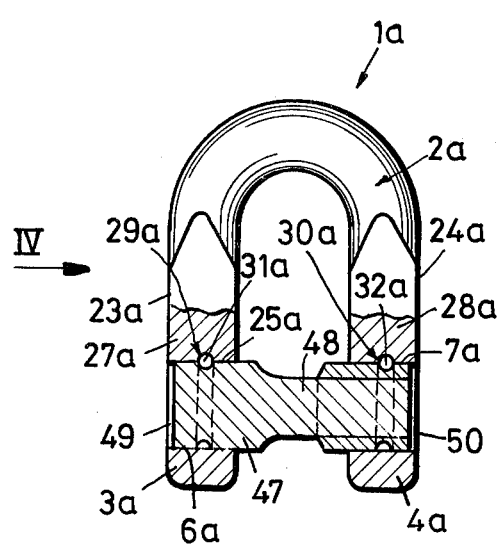
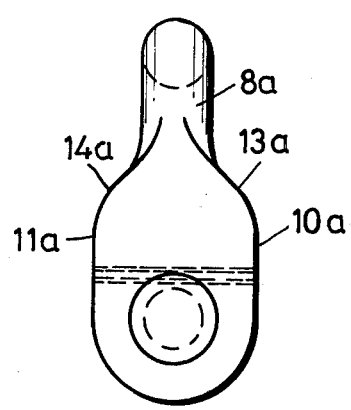
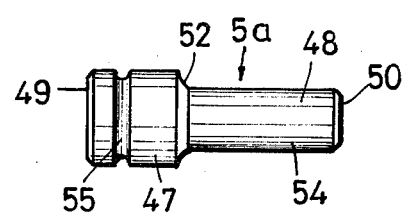
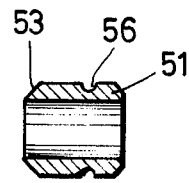

SHACKLE FOR CHAINS, ESPECIALLY FOR SLING CHAINS

The present invention relates to a shackle for chains, more especially for sling chains, which comprises a shackle stirrup and a shackle bolt which, in the closed position of the shackle, is located in aligned bores of the legs of the shackle stirrup and is held thereon by at least one securing part.

With heretofore known shackles of this type, the shackle bolt over its entire length has a cross section that corresponds to the cross section of the bores in the legs. The chains to be connected by the shackle usually consist of oval chains links comprising parallel link sections. Only chain links where the distance between the parallel link sections is at least equal to the shackle bolt diameter can be inserted into the shackle bolt. The size of the chain link which can be inserted into the shackle is thus determined by the diameter of the bores in the legs or by the shackle bolt diameter corresponding thereto.

It is an object of the present invention so to design a shackle of the above mentioned general type that, with a predetermined diameter of the bores in the legs, it is also possible to insert therein chains with which the distance of the parallel link sections of their chain links is less than the bore diameter.

This object and other objects and advantages of the invention will appear more clearly from the following specification in connection with the accompanying drawings, in which:

FIG. 3 shows partly in view and partly in section a second embodiment of a shackle according to the invention.

FIG. 4 is a view seen in the direction of the arrow IV of FIG. 3.

FIG. 5 shows a view of the shackle bolt.

FIG. 6 illustrates a bearing part for the shackle bolt of FIG. 5.

The shackle according to the invention is characterized primarily in that at least one bolt end section extending as far as between the shackle stirrup legs has a cross section that is smaller than the bore cross section.

Further features of the invention emerge from the description, the sub-claims and the drawings.

Figure 2:
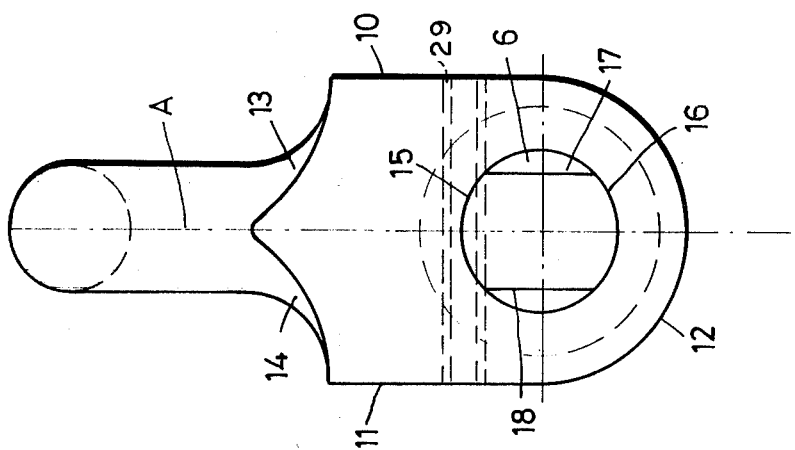
FIG. 2 is a view seen in the direction of the arrow II of FIG. 1.
Figure 1:
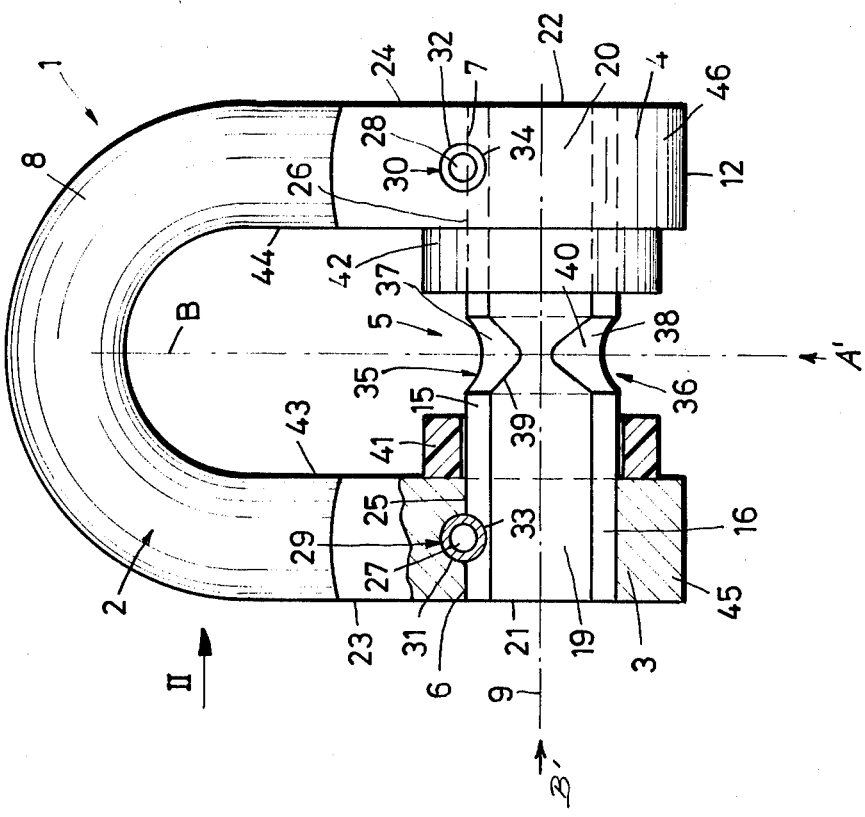
FIG. 1 illustrates partly in view and partly in section a first embodiment of a shackle according to the invention.

Referring now to the drawings in detail, the shackle 1 shown in FIGS. 1 and 2 consists of a shackle stirrup 2 comprising the parallel legs 3 and 4 as well as a shackle bolt 5, which is mounted in the aligned bores 6 and 7 in the two legs 3 and 4. The crosspiece 8 of the shackle stirrup 2 connecting the two legs 3 and 4 is arc-shaped and has a circular cross section. When viewing the longitudinal axis 9 of the shackle bolt 5 in the direction perpendicular thereto (arrow "A'"), the shackle stirrup 2 is of constant width over its entire length. Viewed in the direction of the longitudinal axis 9 of the shackle bolt 5 (arrow "B'"), the two legs 3 and 4 of the shackle stirrup 2 are made wider than the crosspiece 8 and have flat external surfaces 10 and 11 which are parallel to each other and merge with each other through the intervention of a substantially semicircular underside 12 (FIG. 2). The crosspiece 8 and the widened legs 3 and 4 are symmetrical to the transverse central plane A of the shackle 1. The bores 6 and 7 provided in the lower portion of the legs 3 and 4 are coaxial to the leg bottom side 12. The external surfaces 10 and 11 of each leg 3 and 4 merge continuously with the crosspiece 8 via the arc-shaped transitional sections 13 and 14.

Nearly over its entire length, the shackle bolt 5 has an approximately rectangular cross section with rounded narrow sides. The narrow sides are rounded in such a way that they lie on a circle the diameter of which corresponds to the diameter of the bores 6 and 7 in the two legs 3 and 4. The two broad sides 17 and 18 of the shackle bolt 5 are flat and are parallel to each other. The end sections 19 and 20 of the shackle bolt 5 have a cross-sectional surface that is smaller than that of the bores 6 and 7 and extend to the area between the legs 3 and 4. As FIG. 1 shows, the flat front faces 21 and 22 of the shackle bolt 5 lie in one plane with those side faces 23 and 24 of the two legs 3 and 4, which face away from each other and are also flat, so that no sharp edges or projections are formed on the outside of the shackle which might cause injuries in operation or on which the chain might get caught.

With its rounded external faces 15 and 16 and over the entire length and width thereof, the shackle bolt 5 engages the walls 25 and 26 of the two bores 6 and 7, so that the shackle bolt is securely supported. In order to ensure a reliable fit of the shackle bolt in the bores, it is mounted in the bores in a press fit. In order to prevent an axial displacement within the bores, the shackle bolt is secured in the region of its end sections by the securing parts 27 and 28. The securing parts 27, 28, which may, for example, be clamping sleeves, are respectively located in ports 29 and 30, which extend vertically to the longitudinal bolt axis 9 and are formed by semicircular grooves 31 and 32 in the legs 3 and 4 as well as by grooves 33 and 34 in the end sections 19 and 20 of the shackle bolt 5. The grooves 31 and 32, when viewed in the axial direction of the securing parts 27, 28, are semicircular. As shown in FIG. 2, the grooves 33 and 34 are provided in the bolt end sections 19 and 20 in one of the two rounded external sides 15 and 16 of the shackle bolt. The ports 29, 30 are located midway in the legs 3 and 4 and extend vertically to the two flat longitudinal sides 17 and 18 of the bolt sections 19, 20, which extend parallel to the transverse central plane A of the shackle. In its mounted position, the shackle bolt is symmetrical to the transverse central plane A, so that the shackle is uniformly stressed in operation. In order to support the securing parts 27, 28 satisfactorily by the legs 3 and 4, and thus to ensure a high degree of protection against an axial displacement of the bolt even under high stresses, the length of the securing part corresponds to the width of the legs 3 and 4.

In the region between the two legs 3 and 4, the shackle bolt 5 comprises two insertion or suspension grooves 35 and 36 for a chain link to be suspended therein. These grooves are symmetrical to the longitudinal central plane B and to the transverse central plane A of the shackle stirrup 2 respectively. The two insertion grooves are respectively provided in the two rounded external faces 15 and 16 of the shackle bolt 5 and extend into the flat longitudinal sides 17 and 18 of the shackle bolt (FIG. 1). The bottoms 37 and 38 of the two insertion grooves are curved convexly in the circumferential direction, and concavely in the longitudinal direction of the shackle bolt, so that the chain link to be inserted engages the insertion groove bottom with the entire area of its internal surface. As will be seen from FIG. 1, the bottoms 37 and 38 of the two insertion grooves 35 and 36 merge approximately continuously with the flat longitudinal sides 17 and 18 of the shackle bolt. The edges 39 and 40 bounding the insertion grooves in the circumferential direction of the shackle bolt converge and merge with each other in the shape of an arc. The ends of the two insertion grooves which ends are located in the flat longitudinal sides 17 and 18 of the shackle bolt, are spaced from each other by only a short distance so that there is formed an insertion groove which extends nearly over the entire circumference. This ensures in an advantageous manner that a chain link inserted in the shackle bolt can without being impeded turn around the shackle bolt, despite the approximately rectangular shackle bolt cross section, and thus is subjected to little wear.

The chain link inserted in the shackle bolt is secured in its position by the two insertion grooves, so that in operation it lies centrally on the shackle bolt and cannot be displaced in the axial direction of the shackle bolt. In this way, for example when loads are lifted, the inserted chain link is prevented from being shifted along the shackle bolt to one of the legs, where otherwise a high shearing stress would occur and the shackle bolt might be caused to shear.

The inserted chain link can additionally be secured in its central position by providing the shackle bolt 5 with two stop or abutment members 41 and 42 which are located on both sides of the insertion grooves 35 and 36. In the embodiment shown, each of the two stop members 41 and 42 is formed by a ring on the bolt, said ring respectively engaging those internal faces 43 and 44 which face each other and form part of the legs 3 and 4. The distance between the two rings is greater than the width of the two insertion grooves measured in the axial direction of the bolt, so that the inserted chain link is not hindered in its movability by the two stop members 41 and 42. Since the diameter of the two stop members 41 and 42 is less than the width of the legs 3 and 4 measured vertically to the longitudinal bolt axis, and since furthermore the legs with their free leg ends 45 and 46 project over the stop members, the stop members lie in protected position between the two legs and, therefore, can practically not be damaged or become worn. Advantageously, the two annular stop members 41 and 42 are only loosely placed on the shackle bolt, so that there results a simple mounting of the shackle. Another advantage of the arrangement of the stop members 41 and 42 results from the fact that the free bending length of the shackle bolt is reduced considerably, so that when stressing occurs, a higher degree of resistance is offered to any deflection of the shackle bolt.

Since the cross-sectional area of the shackle bolt 5 is smaller than the cross-sectional area of the bores 6 and 7, also such chain links can be placed upon the shackle bolt with which the distance between the parallel link sections facing each other is less than the bore diameter. Although the shackle bolt has a height corresponding to the bore diameter, the small chain links can be placed thereon if, when being placed on said bolt, the link sections of the chain link which are parallel to each other are parallel to the flat broad sides 17 and 18. The shackle bolt is inserted into the bores 6 and 7 with its end sections 19 and 20 in such a way that its broad sides 17, 18 lie in the direction in which the shackle bolt is under load. In this way, the shackle bolt has a high moment of resistance against bending, despite its relatively small width, so that it has a high carrying capacity. Due to the relatively high carrying capacity of the shackle bolt, the carrying capacity of the chains to be inserted and consisting of small chain links can be better made use of. Both chain strands and hooks or rings can be inserted into the shackle according to the invention. The shackle according to the invention can be produced at low costs and easily since the shackle stirrup is a drop-forged element and the shackle bolt is made on an automatic machine from a rectangular bar. To facilitate the mounting, marks, for example notches (not shown), may be provided on the widened legs 3 and 4 of the shackle stirrup 2, so as to ensure that the shackle bolt can only be inserted into the bores in such a way that its grooves 33, 34 for the securing parts are capable, with the associated grooves 31, 32, to form the ports 29, 30 for the securing parts.

FIGS. 3 to 5 show a second embodiment of a shackle 1a according to the invention, the shackle stirrup 2a of which is substantially of the same design as the shackle 2 of the first embodiment. Only the transitional sections 13a, 14a which in the previous embodiment merge with the flat external faces 10, 11 of the two legs 3, 4 while forming an edge, merge in the embodiment of FIGS. 3 to 5 in a continuously curved manner both with the crosspiece 8a and with the external faces 10a, 11a. The shackle bolt 5a comprises a head 47 forming a bearing part, and a shank-like end section 48 adjoining said head 47. The shackle bolt 5a has a circular cross section over its entire length, the bolt head 47 having a larger diameter than the end section 48. The shackle bolt has its head 47 located in the bore 6a of the leg 3a and projects with its end section 48 into the bore 7a of the other leg 4a of the shackle stirrup 2a. As FIG. 3 shows, the two front faces 49 and 50 of the shackle stirrup 5a are located in the same plane as the associated side faces 23a and 24a of the two legs 3a and 4a. The diameter of the head 47 corresponds to the bore diameter. Thus the shackle bolt head with its entire area engages the bore wall 25a of the bore 6a. In order to secure the shackle bolt also in the other bore 7a, there is provided a sleeve-shaped bearing part 51, the external diameter of which corresponds to the bore diameter and which is placed on the shank-shaped end section 48. In order to ensure a satisfactory fit of the shackle bolt 5a, the bolt head 47 and the bearing part 51 are advantageously fitted in the associated bores 6a and 7a with a press fit. The shank-shaped end section 48 has a smaller diameter than the bore 7a, so that also such chain links can be placed upon shackle bolt 5a with which the distance between the parallel link sections is smaller than the bore diameter or which, in the case of ring links, have a diameter that is smaller than the bore diameter. Advantageously, the shank-like end section 48 extends so far into the area between the two legs 3a, 4a that the inserted or suspended chain link can be mounted centrally on the bolt 5a.

As FIG. 3 shows, the bolt head 47 and the bearing part 51 have the same length in the axial direction of the shackle bolt and from the bores 6a, 7a project into the region between the two legs 3a, 4a. The front faces 52 and 53 of the head piece 47 which face each other and the bearing part 51 form stop faces, in order to prevent an axial displacement of the inserted chain links on the shank-like end section 48, so that the shackle bolt and the shackle stirrup and the bearing areas for the shackle bolt respectively are uniformly loaded by the inserted chain link. Due to the circular cross section of the shank-like end section 48, the inserted chain link can rotate freely around the shackle bolt. In an advantageous manner, the front faces 52 and 53 of the bolt head 47 and of the bearing part 51, which form the stop faces, are arranged so as to diverge from one another, so that the free movability of the inserted chain link is not impaired by the stop face.

The bearing part 51 is so inserted into the bore 7a that it does not project beyond the side face 24a of the leg 4a but is flush with this face 24a. The bearing part 51 surrounds the free end 54 of the shank-like end section 48 and securely supports the relatively thin end section 48. The free bending length of the shackle bolt 5a is reduced by the bearing part 51, so that also the shackle bolt of this embodiment has a high carrying capacity in spite of its thin shank-like end section 48.

Both in the bolt head 47 and in the bearing part 51, there are respectively provided annular grooves 55, 56 which in mounted condition of the shackle together with the correspnding grooves 31a, 32a, in the legs 3a, 4a form the ports 29a, 30a for the securing parts 27a, 28a.

Advantageously, the bearing part 51 is already mounted in the bore 7a, so that all that is needed for mounting the shackle, is to insert the shackle bolt 5a with its end section 54 into the bearing part 51 and to secure it in this mounted position by means of the securing part 27a, which advantageously is a pin.

As will be evident from the above, due to the design according to the invention, also chains with which the distance between the parallel link sections of the chain links is less than the bore diameter, can be inserted into the shackle. The link size of the chain to be inserted is, therefore, no longer determined by the shackle bore diameter, thus allowing the shackle according to the invention to be used for a larger number of chains of different chain link sizes. In the case of small chain links, the bolt is passed with its end section having a reduced cross section in a simple manner through the chain link which is to be inserted and which will then be located in the area between the two shackle stirrup legs. Since it is possible to use to shackle according to the invention with a predetermined bore diameter for a fairly large number of chains of varying link sizes, fewer shackles of different sizes have to be kept in stock. Due to the cross-sectional reduction of the shackle bolt end section, it is possible to economize in material and weight, which has a favorable effect on production costs.

It is, of course, to be understood that the present invention is, by no means, limited to the specific showing in the drawings but also comprises any modifications within the scope of the appended claims.

What we claim is:

1. A shackle for chains, especially sling chains, which includes: a shackle stirrup having two arms arranged substantially parallel and in spaced relationship to each other, each of said arms being provided with a transverse bore, and both of said bores being in axial alignment with each other, and a shackle bolt insertable into and non-displaceably securable in said bores for closing said shackle, at least one end section of said bolt having a cross section smaller than the cross section of the respective bore for receiving said at least one end section of said bolt, said bolt being provided with an insertion groove for a chain link to be inserted thereinto, said insertion groove being symmetrical to the longitudinal central plane of the shackle stirrup and transverse to the extension of the axes of said aligned bores, securing means comprising a pin extending transverse to the axis of at least one of said bores for securing said bolt to at least one of said legs, the end section of the bolt extending at least as far as the transverse center plane of the stirrup, said bolt comprising a bolt head having a groove and a shank having a diameter less than that of said head and forming the end section of said bolt, a sleeve-shaped bearing part with the free end of said shank being supported in said sleeve-shaped bearing part, said last mentioned bearing part being positively located in the associated bore of the leg of said shackle stirrup.

2. A shackle according to claim 1, in which said bolt head and said bearing part have end faces facing each other and being located between said two legs of the shackle stirrup.

3. A shackle according to claim 2, in which the distance between said two end faces of said bolt head and said bearing part is at least equal to the diameter of a chain link to be inserted.

4. A shackle according to claim 2, in which those end faces of the bolt head and the bearing part which are farthest from each other are located in substantially one plane with the side faces of said legs which face away from each other, said bolt head and said bearing part having about the same length.

5. A shackle according to claim 2, in which said bearing part is a cylindrical sleeve.

6. A shackle according to claim 2, in which at least one of said bores in said arms has a first groove extending in a direction transverse to the axis of said one bore, and in which at least one end section of said bolt is within the area where it is intended to enter said at least one bore with said pin being provided with said groove adapted to align with said first groove and to define therewith a passage for receiving a locking pin, the head of said bolt and the adjacent shank of said bolt defining with each other said insertion groove for receiving a chain link, said bearing part being provided with a groove, and the groove of the bolt head and the bearing part being annular grooves.

* * * * *